US010131274B1

(12) United States Patent
Chien et al.

(10) Patent No.: US 10,131,274 B1
(45) Date of Patent: Nov. 20, 2018

(54) DISTANCE SENSING METHOD, DISTANCE SENSING SYSTEM, AND WARNING DEVICE USING THE DISTANCE SENSING SYSTEM

(71) Applicant: HONGFUJIN PRECISION ELECTRONICS (TIANJIN) CO.,LTD., Tianjin (CN)

(72) Inventors: Yu-Ching Chien, New Taipei (TW); Chuang-Wei Tseng, New Taipei (TW); Che-Hsun Chen, New Taipei (TW); Chi-Ming Huang, New Taipei (TW)

(73) Assignee: HONGFUJIN PRECISION ELECTRONICS (TIANJIN) C, Tianjin (CN)

( * ) Notice: Subject to any disclaimer, the term of this patent is extended or adjusted under 35 U.S.C. 154(b) by 0 days.

(21) Appl. No.: 15/714,034

(22) Filed: Sep. 25, 2017

(30) Foreign Application Priority Data

Aug. 28, 2017  (CN) .......................... 2017 1 0751491

(51) Int. Cl.
| | |
|---|---|
| *B60Q 1/00* | (2006.01) |
| *B60Q 1/52* | (2006.01) |
| *G09F 13/16* | (2006.01) |
| *B60Q 7/00* | (2006.01) |
| *G09F 13/22* | (2006.01) |
| *G01B 7/12* | (2006.01) |
| *B61L 25/02* | (2006.01) |

(52) U.S. Cl.
CPC .............. *B60Q 1/52* (2013.01); *B60Q 7/005* (2013.01); *B61L 25/026* (2013.01); *G01B 7/125* (2013.01); *G09F 13/16* (2013.01); *G09F 13/22* (2013.01)

(58) Field of Classification Search
CPC ......... B60Q 1/52; B60Q 7/005; B61L 25/026; G01B 7/125; G09F 13/16; G09F 13/22
USPC ........................................................ 340/435
See application file for complete search history.

(56) References Cited

U.S. PATENT DOCUMENTS 6,129,303 A * 10/2000 Karaki ................... G03B 17/26
                                                                    242/421.1
2002/0130214 A1* 9/2002 Nakamura ............. B65H 16/06
                                                                    242/559.2

(Continued)

FOREIGN PATENT DOCUMENTS

| CN | 103310715 | 9/2013 |
|---|---|---|
| DE | 202006003303 | 4/2006 |

(Continued)

*Primary Examiner* — Tanmay Shah
(74) *Attorney, Agent, or Firm* — ScienBiziP, P.C.

(57) ABSTRACT

A system for calculating a distance travelled by a warning device moving towards a required location includes an obtaining module, a first calculating module, a counting module, and a second calculating module. The number of pulses required to turn a motor through one revolution is obtained, and the first calculating module calculates a moving distance of the device per pulse according to the number of pulses and an outer diameter of a wheel. The counting module counts a total pulses issued as the warning device moves from start to finish of a movement. The second calculating module calculates a first moving distance of the warning device according to the total pulses and the distance moved per pulse, also applying rearward image-taking of an object at start and finish of a movement, to confirm calculations. A distance sensing method of the warning device is also provided.

16 Claims, 6 Drawing Sheets

(56) References Cited

U.S. PATENT DOCUMENTS

| | | | |
|---|---|---|---|
| 2004/0179760 A1* | 9/2004 | Nakajima | F16C 19/184 384/448 |
| 2007/0068353 A1* | 3/2007 | Piucci | B65H 35/0006 83/311 |
| 2011/0056808 A1* | 3/2011 | Satoh | B41J 11/42 198/783 |
| 2012/0199073 A1* | 8/2012 | Hofman | A01J 5/0175 119/14.02 |
| 2015/0073623 A1* | 3/2015 | Zhang | G09F 13/16 701/2 |
| 2016/0356005 A1* | 12/2016 | Dolinar | G06K 9/00798 |

FOREIGN PATENT DOCUMENTS

| | | |
|---|---|---|
| KR | 20140134843 | 11/2014 |
| TW | I359064 | 3/2012 |
| TW | 201626347 | 7/2016 |

* cited by examiner

DISTANCE SENSING METHOD, DISTANCE SENSING SYSTEM, AND WARNING DEVICE USING THE DISTANCE SENSING SYSTEM

FIELD

The subject matter herein generally relates to road traffic safety.

BACKGROUND

A warning triangle raised at a distance from a broken-down car can warn other vehicles to slow down or change lanes. Conventional warning devices cannot sense or calculate their own travel distances.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
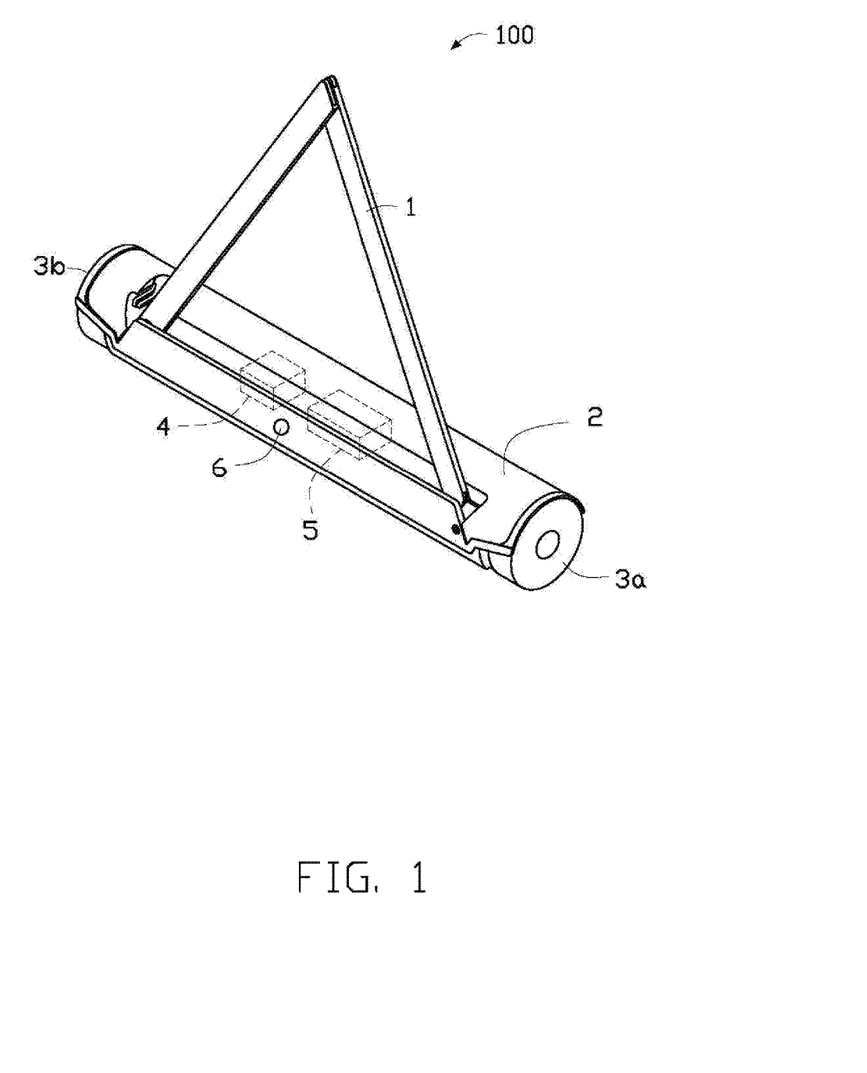
FIG. 1 is a diagram of an exemplary embodiment of a warning device.

FIG. 1 illustrates a warning device 100 in accordance with an exemplary embodiment.

The warning device 100 comprises a warning triangle 1, a base 2, at least two wheels 3a and 3b, a distance sensing system 4, a motor 5, and a camera 6. The at least two wheels in this exemplary embodiment comprise two wheels 3a and 3b. The two wheels 3a and 3b are installed on two sides of the base 2. The distance sensing system can control the motor 5 to drive the warning device 100 to move.

In one exemplary embodiment, the camera 6 can be installed on the base 2.

Figure 4:
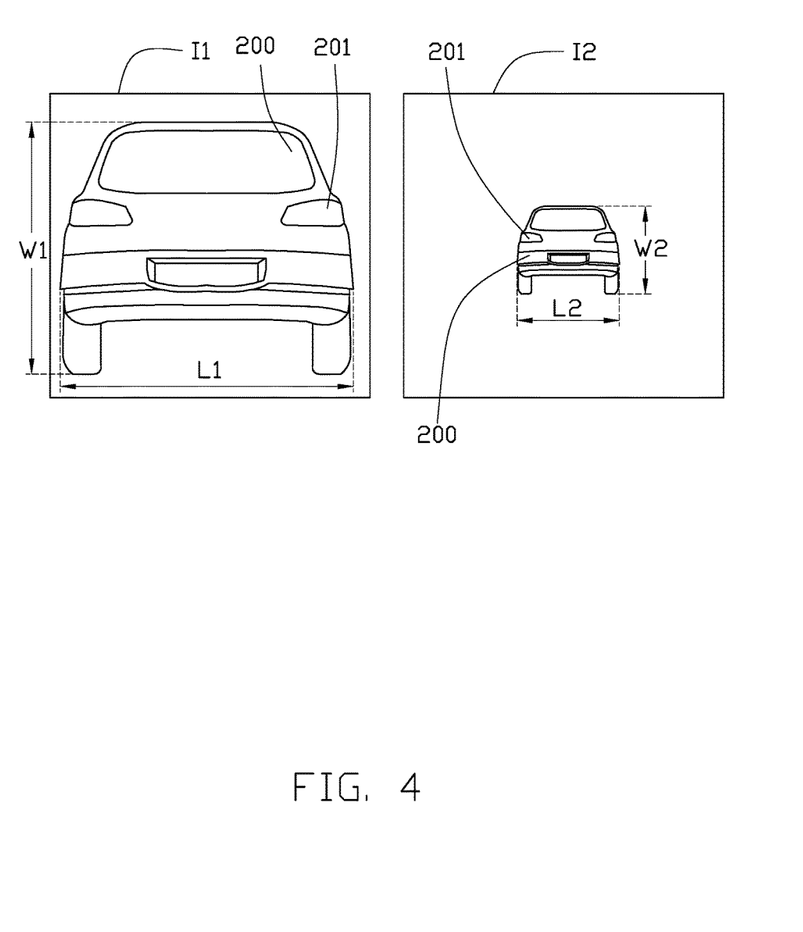
FIG. 4 is a diagram of an exemplary embodiment of images that the warning device captures of a stationary car at a start location and at an end location.

The warning device 100 is raised at a first predetermined distance from a stationary car 200 (as shown in FIG. 4) or other road impediments to warn other vehicles to slow down or change lanes. The first predetermined distance can be in a range from 100 to 150 meters for example.

Figure 2:
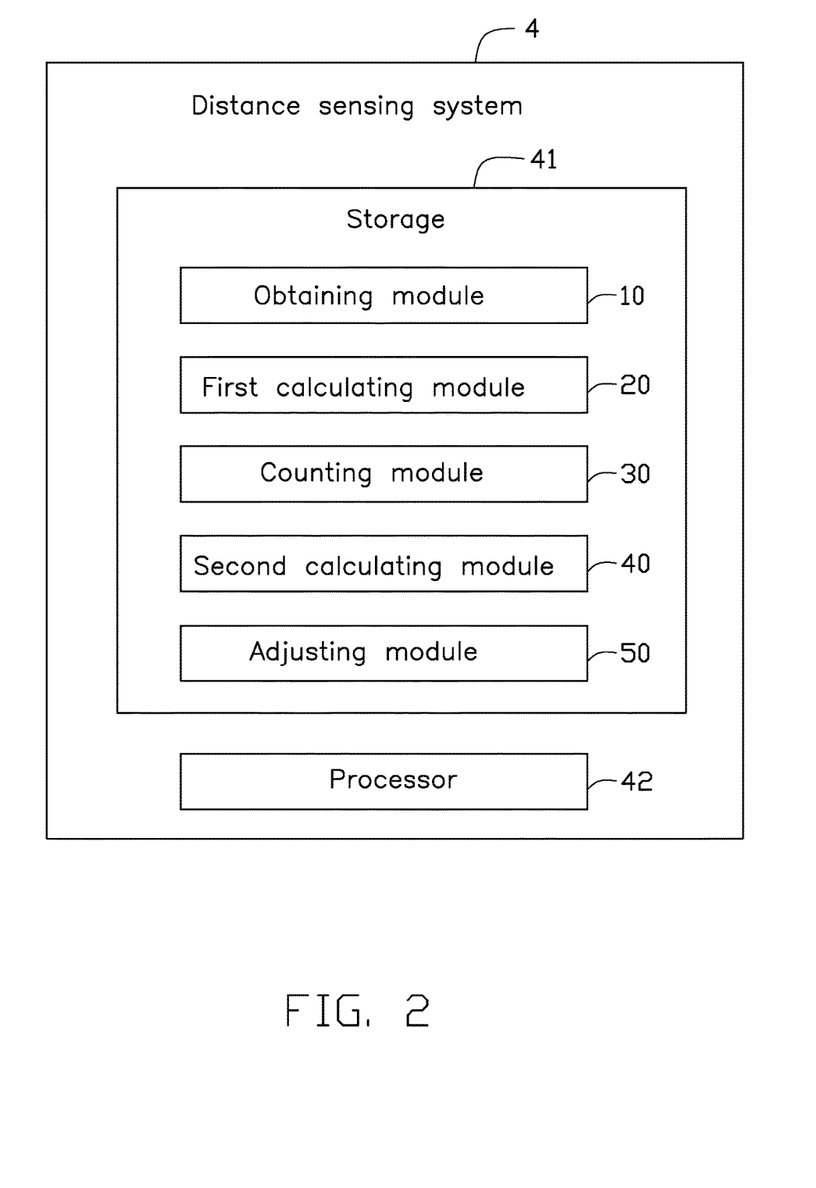
FIG. 2 is a block diagram of an exemplary embodiment of a distance sensing system of the warning device of FIG. 1.

Referring to FIG. 2, the distance sensing system 4 can comprise at least one storage 41 and at least one processor 42. The distance sensing system 4 can further comprises a plurality of modules, such as an obtaining module 10, a first calculating module 20, a counting module 30, a second calculating module 40, and an adjusting module 50. The modules 10-50 can comprise one or more software programs in the form of computerized codes stored in the storage 41. The computerized codes can include instructions that can be executed by the processor 42 to provide functions for the modules 10-50.

The obtaining module 10 is configured to obtain a first number of pulses that corresponds to the motor 5 turning one revolution.

Figure 3:
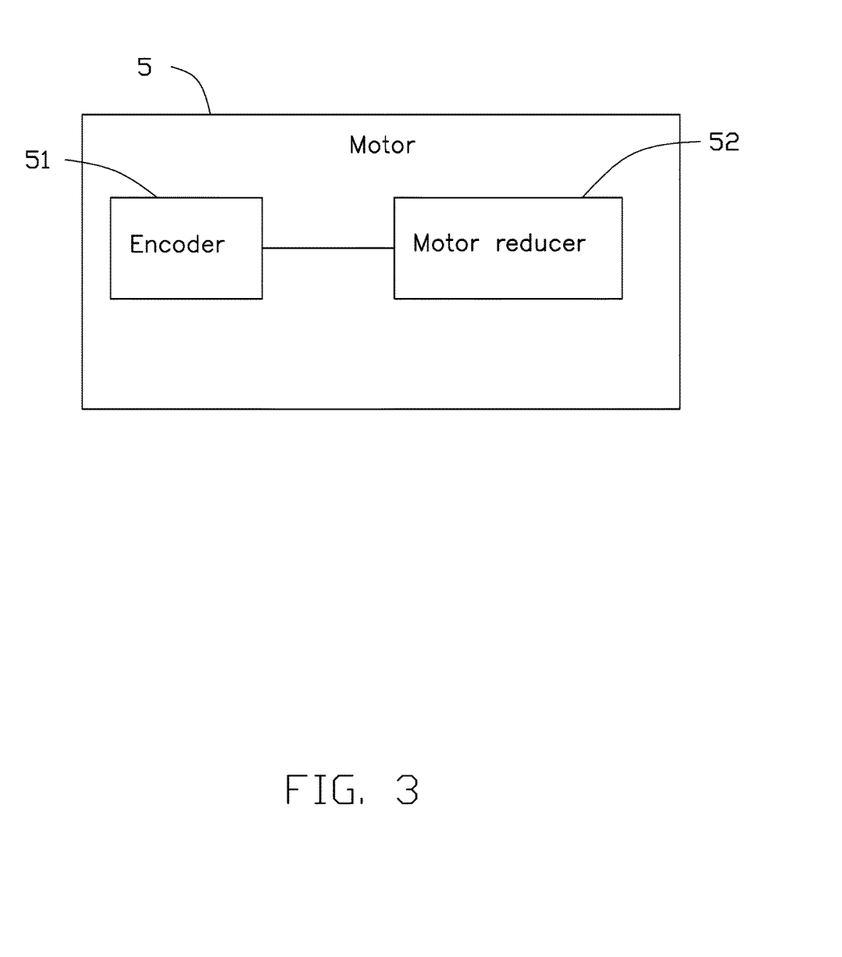
FIG. 3 is a block diagram of an exemplary embodiment of a motor of the warning device of FIG. 1.

In one exemplary embodiment, the motor 5 comprises an encoder 51 (as shown in FIG. 3) and a motor reducer 52 (as shown in FIG. 3). The motor 5 is driven by pulses. When the motor 5 receives the first number of pulses, the motor 5 can turn one revolution. The obtaining module 10 obtains the first number of pulses according to a resolution of the encoder 51 and a speed ratio of the motor reducer 52. A first formula for calculating the first number of pulses is the first number of pulses=the resolution of the encoder 51 multiplied by the speed ratio of the motor reducer 52, where the speed ratio of the motor reducer is an input speed to an output speed.

For example, the resolution of the encoder 51 is 125 counts per revolution (CPR) and the speed ratio of the motor reducer 52 is 19.2, the first number of pulses is calculated to be 2400 (i.e., 125 (CPR)*19.2 (pulses/count)=2400 (pulses/revolution).

The first calculating module 20 is configured to calculate a distance of actual movement achieved by each pulse according to the first number of pulses and an outer diameter of the wheel 3a.

In one exemplary embodiment, the wheel 3a and the wheel 3b have the same outer diameter. A second formula for calculating the moving distance of each pulse is the moving distance of each pulse=the outer diameter of the wheel 3a divided by the first number of pulses. The outer diameter of the wheel 3a is 200 millimeters for example. The actual moving distance of each pulse is thus calculated to be 0.083 millimeter (i.e., 200 (mm)/2400 (pulses)=0.083 (mm/pulse)).

The counting module 30 is configured to count a total number of pulses that the warning device 100 receives from start to finish of an actual movement.

In one exemplary embodiment, the pulses can be outputted by a pulse width modulation (PWM) chip (not shown). The PWM chip is coupled to the motor 5 to output the pulses to drive the motor 5.

The second calculating module 40 is configured to calculate a first moving distance of the warning device 100 according to the total number of pulses and the actual moving distance corresponding to each pulse. A third formula for calculating the first moving distance of the warning device 100 is the first moving distance=the total number of pulses multiplied by the actual moving distance of each pulse.

For example, the total number of pulses received by the warning device 100 from start to finish is 1205. The first moving distance of the warning device 100 is thus calculated to be 100 meters (i.e., 1205 (pulses)*0.083 (mm/pulse)=100 (m)).

Figure 5:
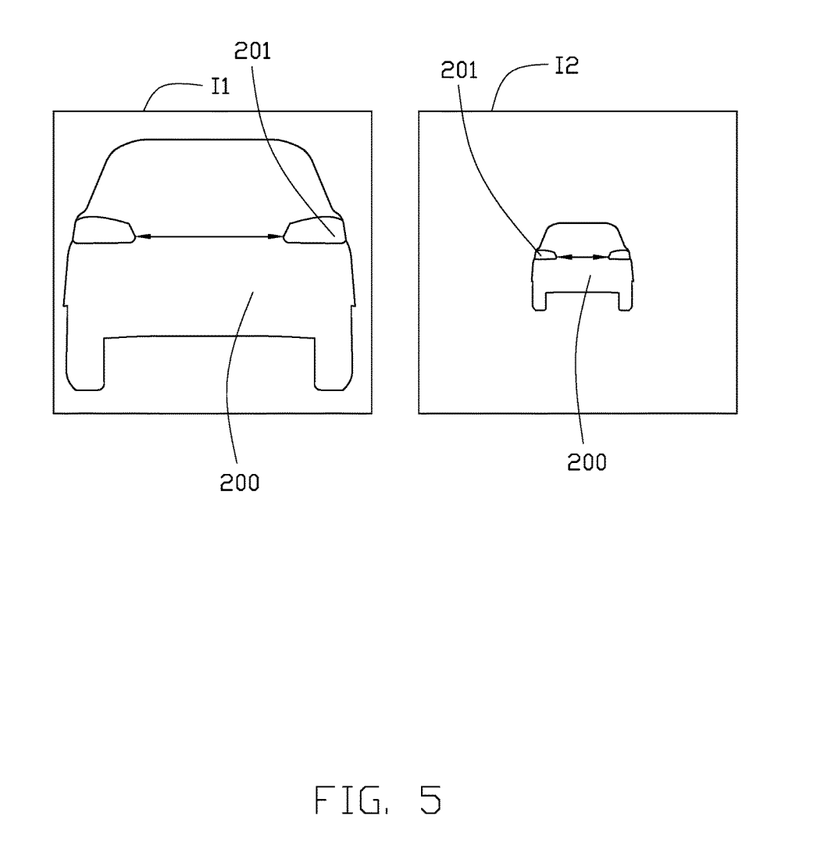
FIG. 5 is a diagram of an exemplary embodiment of images that the warning device captures of taillights of the stationary car of FIG. 4.

In one exemplary embodiment, when the warning device 100 is raised at the first predetermined distance from the stationary car 200 and the wheels 3a and 3b slip or slide, errors may exist in the first moving distance calculated by the second calculating module 40. When the warning device 100 starts to move, the camera 6 captures a first image I1 (as shown in FIG. 4) of a predetermined object. When the warning device 100 finishes moving, the camera 6 captures a second image I2 (as shown in FIG. 4) of the predetermined object. The predetermined object can be the stationary car 200 or taillights 201 (as shown in FIG. 5) of the stationary car 200.

The adjusting module 50 is configured to obtain and analyze the first image I1 and the second image I2 to adjust the first moving distance calculated by the second calculating module 40, according to the analysis.

In one exemplary embodiment, the adjusting module 50 obtains a first pixel value of the predetermined object in the first image I1 and a second pixel value of the predetermined object in the second image I2. The adjusting module 50 calculates a second moving distance of the warning device 100 according to the first pixel value and the second pixel value. The adjusting module 50 further adjusts the first moving distance according to the second moving distance.

In one exemplary embodiment, the adjusting module 50 calculates a difference value between the first moving distance and the second moving distance. When the difference value is greater than a predetermined value, the adjusting module 50 adjusts the first moving distance according to the second moving distance. The predetermined value can be set as 3 meters for example.

In one exemplary embodiment, when the difference value is greater than the predetermined value, the adjusting module 50 replaces the first moving distance with the second moving distance as the final moving distance of the warning device 100.

In one exemplary embodiment, the adjusting module 50 obtains a first length value and a first width value of the predetermined object in the first image I1 and obtains a second length value and a second width value of the predetermined object in the second image I2. The adjusting module 50 calculates the second moving distance according to the first length value, the first width value, the second length value, and the second width value.

Referring to FIG. 4, the predetermined object is the stationary car 200. The first image I1 can be captured when the warning device 100 is one meter behind the stationary car 200 for example. The second I2 can be captured when the warning device 100 is one hundred meters behind the stationary car 200 for example. The adjusting module 50 calculates that the stationary car 200 takes up ninety percent of pixels of the first image I1 and the stationary car 200 takes up thirty percent of pixels of the second image I2 for example. Then, the adjusting module 50 can calculate a real-time moving distance of the warning device 100 according to a pixel percentage of a current image captured by the camera 6.

In one exemplary embodiment, the first length value and the first width value of the stationary car 200 in the first image I1 is L1 and W1. The second length value and the second width value of the stationary car 200 in the second image I2 is L2 and W2. Then, the adjusting module 50 can calculate the second moving distance according to the first length value L1, the first width value W1, the second length value L2, and the second width value W2 to adjust the first moving distance. For example, the adjusting module 50 calculates a first product of the first length value L1 and the first width value W1 of the first image I1 and a second product of the second length value L2 and the second width value W2 of the second image I2. Then, the adjusting module 50 can calculate a real-time moving distance of the warning device 100 according to a product (a length value multiplied by a width value of the predetermined object) of a current image captured by the camera 6.

Referring to FIG. 5, the predetermined object also can be the two taillights 201 of the stationary car 200. The adjusting module 50 can obtain a pixel percentage and/or a separation distance between the two taillights 201 to calculate a real-time moving distance of the warning device 100. For example, the adjusting module 50 calculates a first separation distance between the two taillights 201 of the first image I1 and a second separation distance between the two taillights 201 of the second image I2. Then, the adjusting module 50 can calculate a real-time moving distance of the warning device 100 according to a separation distance of the two taillights 201 of a current image captured by the camera 6.

Figure 6:
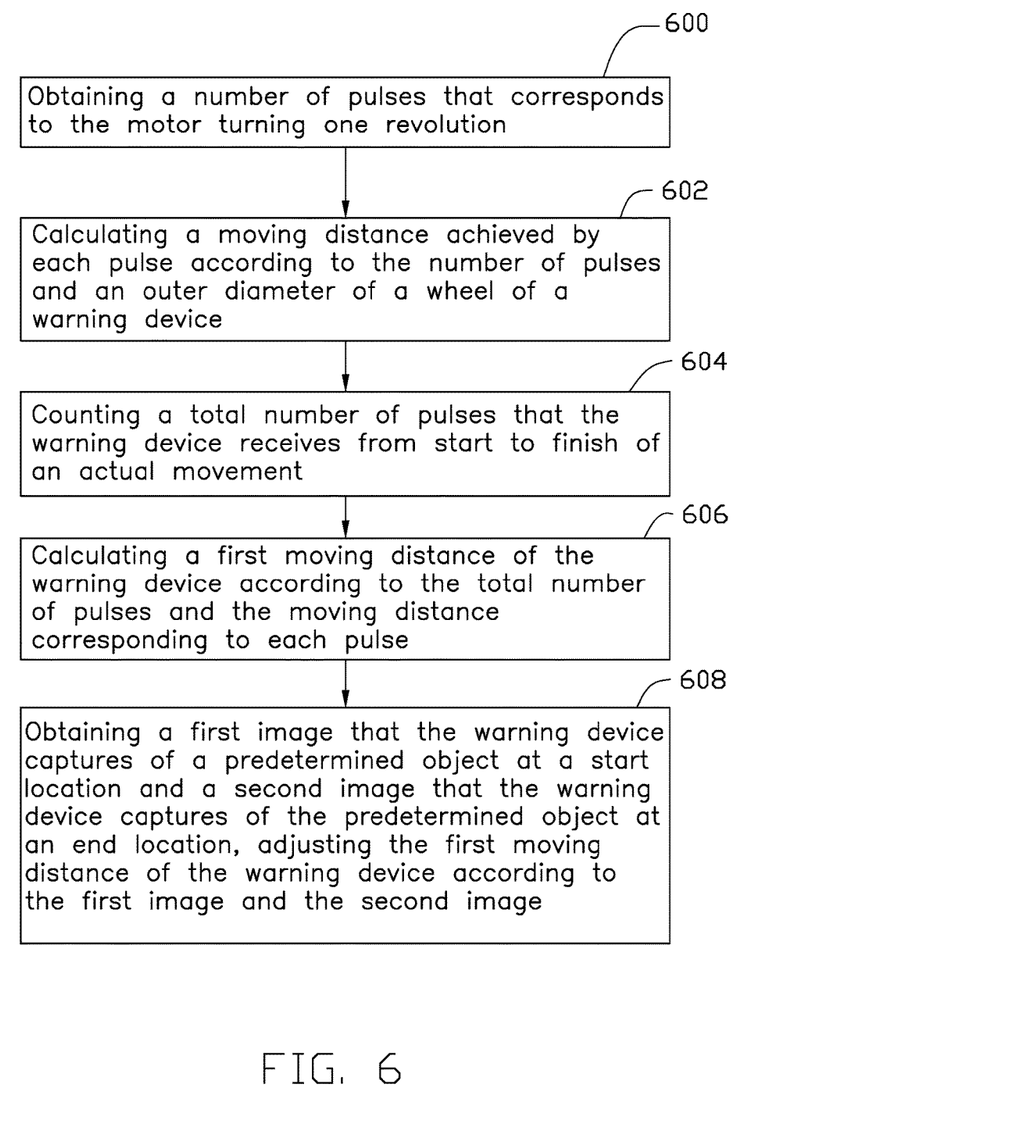
FIG. 6 is a flow diagram of an exemplary embodiment of a distance sensing method of the warning device of FIG. 1.

FIG. 6 illustrates one exemplary embodiment of a distance sensing method of the warning device 100. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 6 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 600.

In step 600, the obtaining module 10 obtains a first number of pulses that corresponds to the motor 5 turning one revolution.

In step 602, the first calculating module 20 calculates a moving distance achieved by each pulse according to the first number of pulses and the outer diameter of the wheel 3a.

In step 604, the counting module 30 counts a total number of pulses that the warning device 100 receives from start to finish of an actual movement.

In step 606, the second calculating module 40 calculates a first moving distance of the warning device 100 according to the total number of pulses and the moving distance corresponding to each pulse.

In step 608, the adjusting module 50 obtains a first image that the warning device 100 captures of a predetermined object at a start location and obtains a second image that the warning device 100 captures of the predetermined object at an end location, and further adjusts the first moving distance according to the first image and the second image.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A distance sensing method of a warning device, the warning device comprising a motor and at least one wheel, the distance sensing method comprising:
   obtaining a number of pulses that corresponds to the motor turning one revolution;
   calculating a moving distance achieved by each pulse according to the number of pulses and an outer diameter of the at least one wheel;
   counting a total number of pulses that the warning device receives from start to finish of an actual movement;
   calculating a first moving distance of the warning device according to the total number of pulses and the moving distance corresponding to each pulse;
   obtaining a first image of a predetermined object that the warning device captures at a start location;
   obtaining a second image of the predetermined object that the warning device captures at an end location; and
   adjusting the first moving distance of the warning device according to the first image and the second image.

2. The distance sensing method of claim 1, wherein obtaining the number of pulses that corresponds to the motor turning one revolution comprises:
   obtaining a resolution of an encoder and a speed ratio of a motor reducer; and
   calculating the number of pulses that corresponds to the motor turning one revolution according to the resolution of the encoder and the speed ratio of the motor reducer.

3. The distance sensing method of claim 1, wherein adjusting the first moving distance of the warning device according to the first image and the second image comprises:
   obtaining a first pixel value of the predetermined object in the first image;
   obtaining a second pixel value of the predetermined object in the second image;
   calculating a second moving distance of the warning device according to the first pixel value and the second pixel value; and
   adjusting the first moving distance of the warning device according to the second moving distance.

4. The distance sensing method of claim 3, wherein adjusting the first moving distance of the warning device according to the second moving distance comprises:
   determining whether a difference value between the first moving distance and the second moving distance is greater than a threshold value; and
   adjusting the first moving distance of the warning device according to the second moving distance in response to the difference value being greater than the threshold value.

5. The distance sensing method of claim 1, wherein adjusting the first moving distance of the warning device according to the first image and the second image comprises:
   obtaining a first length value and a first width value of the predetermined object in the first image;
   obtaining a second length value and a second width value of the predetermined object in the second image;
   calculating a second moving distance of the warning device according to the first length value, the first width value, the second length value, and the second width value; and
   adjusting the first moving distance of the warning device according to the second moving distance.

6. A distance sensing system of a warning device, the warning device comprising a motor and at least one wheel, the distance sensing system comprising:
   at least one processor;
   a storage; and
   one or more programs that are stored in the storage and executed by the at least one processor, the one or more programs comprising instructions for:
      obtaining a number of pulses that corresponds to the motor turning one revolution;
      calculating a moving distance achieved by each pulse according to the number of pulses and an outer diameter of the at least one wheel;
      counting a total number of pulses that the warning device receives from start to finish of an actual movement;
      calculating a first moving distance of the warning device according to the total number of pulses and the moving distance corresponding to each pulse;
      obtaining a first image of a predetermined object that the warning device captures at a start location;
      obtaining a second image of the predetermined object that the warning device captures at an end location; and
      adjusting the first moving distance of the warning device according to the first image and the second image.

7. The distance sensing system of claim 6, wherein obtaining the number of pulses that corresponds to the motor turning one revolution comprises:
   obtaining a resolution of an encoder and a speed ratio of a motor reducer; and
   calculating the number of pulses that corresponds to the motor turning one revolution according to the resolution of the encoder and the speed ratio of the motor reducer.

8. The distance sensing system of claim 6, wherein adjusting the first moving distance of the warning device according to the first image and the second image comprises:
   obtaining a first pixel value of the predetermined object in the first image;
   obtaining a second pixel value of the predetermined object in the second image;
   calculating a second moving distance of the warning device according to the first pixel value and the second pixel value; and
   adjusting the first moving distance of the warning device according to the second moving distance.

9. The distance sensing system of claim 8, wherein adjusting the first moving distance of the warning device according to the second moving distance comprises:
   determining whether a difference value between the first moving distance and the second moving distance is greater than a threshold value; and
   adjusting the first moving distance of the warning device according to the second moving distance in response to the difference value being greater than the threshold value.

10. The distance sensing system of claim 6, wherein adjusting the first moving distance of the warning device according to the first image and the second image comprises:
   obtaining a first length value and a first width value of the predetermined object in the first image;
   obtaining a second length value and a second width value of the predetermined object in the second image;
   calculating a second moving distance of the warning device according to the first length value, the first width value, the second length value, and the second width value; and
   adjusting the first moving distance of the warning device according to the second moving distance.

11. A warning device comprising:
   a warning triangle;
   a base;
   at least two wheels installing on two sides of the base;
   a motor driving the at least two wheels; and
   a distance sensing system comprising
      at least one processor;
      a storage; and
      one or more programs that are stored in the storage and executed by the at least one processor, the one or more programs comprising instructions for:
         obtaining a number of pulses that corresponds to the motor turning one revolution;
         calculating a moving distance achieved by each pulse according to the number of pulses and an outer diameter of one of the at least two wheels;
         counting a total number of pulses that the warning device receives from start to finish of an actual movement;
         calculating a first moving distance of the warning device according to the total number of pulses and the moving distance corresponding to each pulse;
         obtaining a first image of a predetermined object that the warning device captures at a start location;
         obtaining a second image of the predetermined object that the warning device captures at an end location; and
         determining whether the first moving distance need to adjust according to the first image and the second image.

12. The warning device of claim 11, wherein obtaining the number of pulses that corresponds to the motor turning one revolution comprises:
   obtaining a resolution of an encoder and a speed ratio of a motor reducer; and
   calculating the number of pulses that corresponds to the motor turning one revolution according to the resolution of the encoder and the speed ratio of the motor reducer.

13. The warning device of claim 11, wherein the one or more programs further comprises:
   adjusting the first moving distance of the warning device according to the first image and the second image in response to the first moving distance being determined to adjust.

14. The warning device of claim 13, wherein adjusting the first moving distance of the warning device according to the first image and the second image comprises:
   obtaining a first pixel value of the predetermined object in the first image;
   obtaining a second pixel value of the predetermined object in the second image;
   calculating a second moving distance of the warning device according to the first pixel value and the second pixel value; and
   adjusting the first moving distance of the warning device according to the second moving distance.

15. The warning device of claim 14, wherein adjusting the first moving distance of the warning device according to the second moving distance comprises:
   determining whether a difference value between the first moving distance and the second moving distance is greater than a threshold value; and
   adjusting the first moving distance of the warning device according to the second moving distance in response to the difference value being greater than the threshold value.

16. The warning device of claim 13, wherein adjusting the first moving distance of the warning device according to the first image and the second image comprises:
   obtaining a first length value and a first width value of the predetermined object in the first image;
   obtaining a second length value and a second width value of the predetermined object in the second image;
   calculating a second moving distance of the warning device according to the first length value, the first width value, the second length value, and the second width value; and
   adjusting the first moving distance of the warning device according to the second moving distance.

* * * * *

UNITED STATES PATENT AND TRADEMARK OFFICE
CERTIFICATE OF CORRECTION

PATENT NO. : 10,131,274 B1
APPLICATION NO. : 15/714034
DATED : November 20, 2018
INVENTOR(S) : Chien et al.

It is certified that error appears in the above-identified patent and that said Letters Patent is hereby corrected as shown below:

On the Title Page

Item (73), should read as follows:
(73) Assignees: HONGFUJIN PRECISION ELECTRONICS (TIANJIN) CO., LTD.,
Tianjin (CN);

Signed and Sealed this
Nineteenth Day of April, 2022

Katherine Kelly Vidal
*Director of the United States Patent and Trademark Office*